March 16, 1954 — J. H. McCOY — 2,672,509

TELETYPEWRITER FREQUENCY SHIFT TRANSMISSION

Filed April 1, 1949 — 2 Sheets-Sheet 1

Inventor

JOHN HARVEY McCOY

By Harry M. Saragovitz

Attorney

March 16, 1954 J. H. McCOY 2,672,509

TELETYPEWRITER FREQUENCY SHIFT TRANSMISSION

Filed April 1, 1949

2 Sheets-Sheet 2

Inventor

JOHN HARVEY McCOY

By Harry M. Saragovitz

ATTORNEY

Patented Mar. 16, 1954

2,672,509

UNITED STATES PATENT OFFICE 2,672,509

TELETYPEWRITER FREQUENCY SHIFT TRANSMISSION

John Harvey McCoy, Huntington, N. Y., assignor to the United States of America as represented by the Secretary of the Army Application April 1, 1949, Serial No. 85,012

3 Claims. (Cl. 178—66)

(Granted under Title 35, U. S. Code (1952), sec. 266)

This is a continuation in part of my application now abandoned Serial No. 509,999 filed November 12, 1943, for the same subject matter.

The invention described and claimed herein may be manufactured and used by or for the Government for governmental purposes, without the payment to me of any royalty thereon.

This invention relates to improvements in devices for radio and wire telegraph teletypewriter communication and the like.

Appreciable improvement has been obtained in radio teletypewriter and telegraph communication by employing two distinct oscillators to provide one radio frequency for the mark pulse and another frequency for the space pulse. While this method is generally effective for radio teletypewriter operation, there is still an appreciable time of transition from one frequency to the other, which is very noticeable and, with the instantaneous rise and fall of the signals produces clicks and thumps.

Development of "frequency shift" transmission was a further advance in which the output of a single transmitter is shifted from one frequency to another to produce "mark" signals on one frequency, and "space" signals on the other, but was fraught with similar and other objections, the mere instantaneous shift tending also to produce "clicks" and "thumps," and there were difficulties in maintaining stability of signal frequency and amplitude levels. These clicks and thumps are understood to be manifestations of wave harmonics produced by a square shift of frequency, analogous to effects manifest in the transmission of a "square wave" signal, and understood from the principles involved in the application of the Fourier equations, discussed in various publications, as for instance, Glasgow's "Principles of Radio Engineering," McGraw Hill, 1936.

Due principally to this invention, teletypewriter systems of radio transmission (using signals alternated on two frequencies) of which a generally used embodiment is commercially available under the trade name "Teletype," have been found a highly satisfactory and effective means for radio communication over long distances, including transoceanic channels, in the face of unfavorable climatic and magnetic conditions in space intervening between transmitters and receivers (especially with diversity reception), accompanied by advantages in secrecy and comparatively high speed operations. Earlier, the teletypewriter systems were largely limited to wire transmission, few radio developments were operative and these were objectionable in so many ways that none attained practical success.

It was found peculiarly difficult to overcome interference with communications in other channels produced by the mere frequency shift with a square wave equivalent of shift, and wide use of teletypewriter apparatus was long limited to wire lines on that account. This difficulty is accentuated by the fact that in the ultimate development of teletypewriter mechanisms responsive to frequency shift signals, the receiving apparatus is dependent on each of the transmitted frequencies to energize respective mechanisms, one for "space" operations, and the other for "mark" operations. As the system is only valuable for its relatively high speed operations, the "square" shift seemed at first essential, as it would permit an immediate establishment of the necessary energizing signal of ample duration on each frequency. Avoiding the "click" and "thump" by modifying the angularity of the shift, involves liability that sacrifice of duration of the signals at flat levels may occur to such extent that dependable operation of the two mechanisms is impaired. The lower harmonics are believed the principal offenders in producing the clicks and thumps, but whether so or not, my invention has been found effective in reducing these effects to such extent that interferences are immaterial or obviated while retaining the requisite certainty of operation of the remote receiving mechanisms. As a result, radio teletypewriter communication utilizing the type of mechanisms indicated has multiplied greatly, fifty and more transoceanic systems having been in operation at one time, in addition to many land radio teletypewriter channels.

The importance of the invention in its capability of meeting peculiar requirements of transmission and certainty of operation of electro-mechanical instruments at the receiving station may be further appreciated when the vagaries of fading and the inherent liabilities of phase disturbances found in prior conventional systems of radio signalling and reception are considered. The effects remedied in some degree by diversity reception are well understood, and the value of the stable levels of both frequencies transmitted by the instant invention in increasing the certainty of response of the receiving station mechanism within the available code unit duration will become apparent from the disclosure.

While my invention may be applied to the operation of various receivers and electric typewriters, the particular commercial apparatus mentioned (Teletype) is representative of a class which has been found most satisfactory and is universally used. In these machines the sending station utilizes a "keyer" which transmits alphabetical, numerical, and other characters, by means of a "code," in which several signal shifts of the frequencies transmitted occur for each character, and the receiving apparatus responds to each code signal according to the number and order of the "space" and "mark" impulses so received, to print a corresponding character. It has been found advantageous to use the same number of units in each character signal, and the apparatus called the "Teletype" uses what is known as the "five unit" code. There have been developed "seven unit" code systems in other commercial systems but the essential functions and results are generally similar.

According to current practice with the "five unit code" utilizing my invention, transmission of communications which are fully written out—that is, printed—by the receiver apparatus, has been carried out at speeds of 40 to 100 words and more per minute. The limitation of speed is imposed by the capability of the keyboard operator and machines. Manual operation of the keyboard permits a rate of 40 to 50 words per minute. Speeds up to 400 words per minute have been effected by using perforated tape records fed into appropriate transmitter machines, and receiving the transmitted radio communications on what are termed "tape relay stations," producing punched tape, which is afterward fed into lower speed tape-operated electric typewriter machines, so that several such typewriters may be writing the material received over one channel and receiver at a tape relay station. Or the tape may be cut into parts and fed into transmitters operating on channels to respective widely separated destinations.

Considering the use of the common teletypewriter system at 75 words per minute with the "five unit" code, seven impulses are required for each character, because in addition to the five units of the code, each character group begins with a "space" and ends with a "mark." Thus 450 characters and word spaces per minute would be involved, or 3,150 "units" of either mark or space per minute. The higher word rate speeds would involve correspondingly greater numbers of "units." These speeds compare with approximately 375 key movements per minute by fast manual key telegraphers.

From the foregoing an understanding may be derived of the great rapidity of the key shifts involved in practical operation of the invention, and the need for making the transmitted code "units" as long as possible and of exceedingly stable frequency at each limit of shift, in order that a dependable response of mechanical recording devices to each unit of each code symbol may be assured. A high degree of accuracy of transmitted information is manifest in the use of such systems embodying my invention, and it has been generally adopted by governmental and commercial radio teletypewriter communications systems. Using what is known as the Boehme keyer and receiver, rates from 400 to 600 words per minute have been attained.

It is an object of this invention to provide a system of radio telegraph and teletypewriter communication in which a definite steady signal of either one fixed frequency or an alternate one is always on the air, the "carrier" or assigned frequency being modulated by keying to produce an alternate one, so as to provide two distinct frequencies of fixed values for mark and space pulses respectively. The energy radiating does not leave the air when a "space" signal occurs, but shifts lower by 850 cycles (from a normal chosen in the range, say, between 1.8 megacycles and 6 megacycles, or higher), and the radio receiver's beat frequency oscillator immediately records this change. By means of a system of detectors and filters at the receiving station the two signals are rectified, amplified and converted to resultant power in respective circuits which is made to actuate respective mechanisms or devices of recording machines, one form of which is called a "printer."

A further object is to provide a radio telegraph and teletypewriter communication system in which a transmitter is constantly excited by the output of a crystal oscillator whose frequency is modulated by a separately excited oscillator having frequency affected by reactance means controlled by keying to produce one frequency for a mark pulse and another frequency for a space pulse.

A further object is the provision of a radio teletypewriter and telegraph communication system in which a normally operating frequency is modulated by reactance-controlled means to produce a second predetermined frequency so as to provide one frequency for mark pulses and another frequency for space pulses without introducing objectionable harmonics interference incident to the shift from one to the other.

These and other objects are attained by the novel method, apparatus and arrangement hereinafter described and illustrated by the accompanying drawings, in which—

Figure 1:
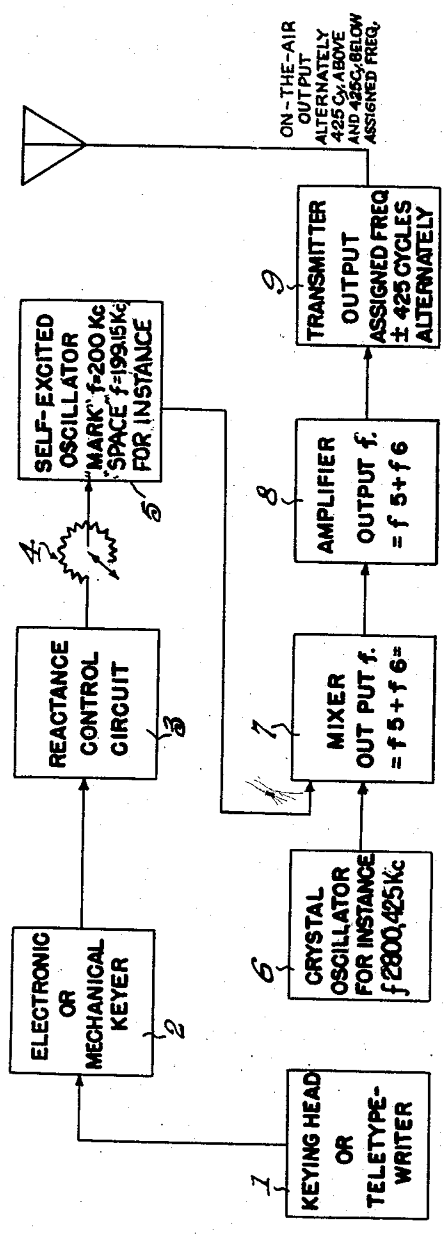
Figure 1 shows a block diagram of an arrangement embodying the invention.

Referring to the block diagram of the drawings, the radio teletypewriter and telegraph system is shown to comprise a keying head or teletypewriter 1, of any conventional type (for instance, the well-known "Teletype" sending machine) for operating an intermediate keyer 2, which may be a mechanical or an electronic keying device. The keyer 2 is connected to a reactance circuit unit or modulator 3 controlling the frequency of a self-excited oscillator 5, the latter being the sole direct-acting modulator of the output frequency, as will appear.

A shift control or limit device 4 interposed between the reactance unit 3 and the oscillator 5 or otherwise analogously associated with the reactance circuit, enables the frequency-shifting characteristics of the reactance modulator operation to be adjusted to different predetermined values, and particularly one establishing the chosen shift of frequency.

The output of a crystal oscillator 6 having a definite fixed frequency is mixed additively with the normal frequency of the self-excited oscillator to provide a signal of two limits of frequency, and one of which is always on the air. The output of the crystal oscillator is fed to a mixer 7 where it is mixed with the output of the self-excited oscillator. The output of the mixer is then passed through amplifier 8 to excite the transmitter 9. On this account the elements numbered 3 to 8 above, taken together may be termed an exciter.

The crystal oscillator operates at a frequency within a range comprising a band of available channels with a lower limit of about 1.8 megacycles, and in each instance a few hundred kilocycles below the desired lower output frequency of the mixer 7; and the self-excited oscillator 5 operates at a frequency equal to the exciter output frequency minus the crystal oscillator frequency.

The self-excited oscillator 5 in the specific instance chosen for discussion tends to operate constantly at 200 kilocycles and the normal exciting frequency for the transmitter is equal to the frequency of the crystal oscillator plus 200 kilocycles. After reaching the transmitter this exciting frequency may be multiplied. The frequency of the crystal oscillator can be determined by dividing the predetermined upper output frequency of the transmitter by the number of times the exciting frequency is doubled in the transmitter and subtracting 200. That is, the crystal oscillator frequency plus 200 equals normal $$\frac{\text{frequency}}{1 \text{ or } 2 \text{ or } 4 \text{ or } 8}$$

of the transmitter. The amount of frequency shift in the 200 kilocycles self-excited oscillator 5, can be adjusted to different values by adjusting the shift control 4. It has been found that a shift of the transmitted frequency by about 850 cycles is preferred.

In operation, the transmitter is normally constantly excited by a frequency equal to the frequency of the crystal oscillator plus 200 kilocycles, the latter being the normal or "mark" frequency of the self-excited oscillator. When a key is closed or opened, as may be desired, the reactance modulator 3 changes the characteristics of the self-excited oscillator circuit and causes the frequency thereof to shift 850 cycles, or any other number of cycles as may be previously determined. As actually used, this shift is subtractive so that the frequency of this oscillator becomes 199.15 kilocycles, for a transmitter output without doubling. The extent of shift of frequency can be adjusted by the shift control 4. The shift in the frequency of the oscillator 5 accordingly causes a shift in the exciter output frequency, thus causing the transmitter to radiate the alternate and lower one of two different frequencies. It will be seen that there will be no material time of transition from one frequency to the other, as the transmitter is at all times radiating either one or the other of the frequencies. Accordingly, and additionally, due to the interposition of the reactance tube between the keyer 2 and the self-excited oscillator, there will be no clicks or thumps such as occur in the usual make and break system or in the usual mere shifting from one frequency to another by keying.

Considering more particularly the elements of the system, it may be explained that the sending keyboard indicated at 1 in Figure 1, is in practice a simple set of key levers resembling a typewriter keyboard, by which, on depression of a given key, a set of cams and selectors of proper function are operated to transmit at 2 a nhmber (in the specific case illustrated, seven) of make and break signals of special order. These cause transmission of a number of "space" and "mark" impulses in the required sequence to represent the code pattern of, and to cause printing of, a particular character (represented on the depressed keyboard key) at the remote "printer," or to effect a control of some other machine function. As before mentioned, a tape relay record and corresponding sending machine may be employed in place of the keyboard, so that a more rapid transmission of the code elements is effected, and either a "printer" or a more rapid tape perforator employed at the receiving station. In either case, the signal values "on the air" consist of shifts of the transmitted frequency from low to high, or vice versa, and while the term "carrier" has been employed to designate the wave force projected, it may be understood that this term is used for convenience to indicate the assigned frequency for a transmitting station. It does not carry the usual connotation, and is in fact a misnomer, since there is no actual "carrier" which is modulated while on the air to give significant signals, but there is simply either one flat frequency or another, and the two are independent and alternative.

Figure 2:
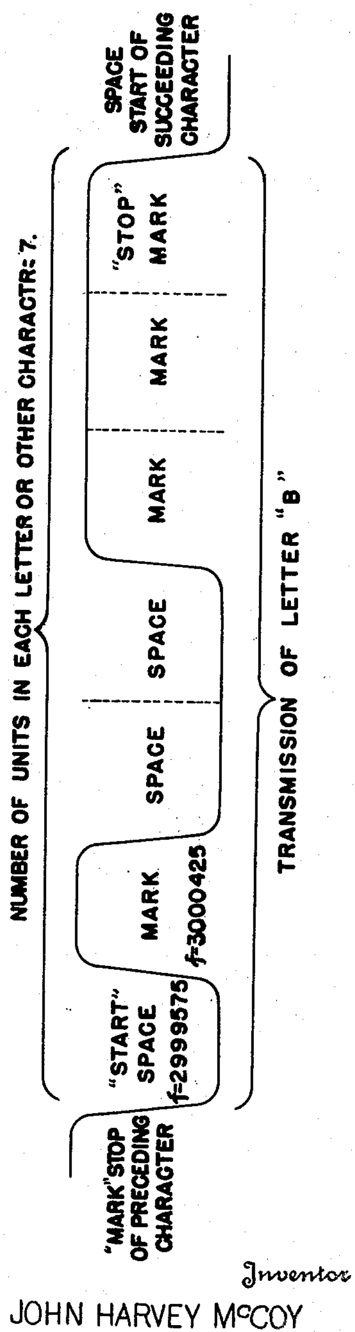
Figure 2 is a representation of a typical series of signals for a single character capable of operating electrical typewriter mechanisms so as to print the corresponding character.

The higher of these frequencies constitutes a "mark" signal, and the lower one a "space" signal, in the general practice of the art. In certain character code groups two or more similar code units occur in immediate succession (see Figure 2), and in such case (using a current form of teletypewriter apparatus) the particular frequency representing these units is simply maintained steadily for a period equal to the sum of the intervals of time which would be required to transmit the same number of discrete units. The receiving apparatus is nearly, but not exactly, synchronized in certain essential basic movements with corresponding movements of the sending machine, so that setting or selector members moving in timed sequence in the receiver will be successively brought to positions to respond to related "mark" or "space" signals of the same order, so that a group of members may be selected or set up at the receiving machine corresponding to the code group transmitted and received, resulting in printing of a corresponding character, for instance. The error in synchronization is purposely made in one direction, and a means is provided whereby the "space" unit forming the beginning of each code group, automatically synchronizes the receiving machine anew with the sending machine.

While in the Teletype machine the initial sending circuit-closing devices—especially those immediately responsive to keyboard operation—are mechanical and to that extent correspond to make and break keying, the frequencies of the makes and breaks greatly exceed the rapidity of customary make and break Morse key operations, as before pointed out; and at the relay 2 it is possible to use certain forms of electronic circuit-interrupting devices, as, electron tubes, with valve or other functions applicable to the changes of the frequency of the 200 kilocycle oscillator. This would be especially advantageous in a tape-relay station where the tape operated machines produce character code units at much higher than manual keyboard sending speeds.

Since the features of the keyboard and the mechanical coding mechanism of the sending machine mentioned—as well as the details of the code signal-responsive printer machine for receiving stations—are well known, the details of these are not illustrated. They form no novel part of the invention, but their general nature and function are briefly referred to in order that the peculiar requirements of the present invention may be better understood.

Similarly, the circuit for the transmitter unit 9 of Figure 1 is not shown in detail, since circuits of this kind are well known and understood. These will vary according to the nature of the service involved, particularly as to distance over which the signal is to be transmitted, and the frequency, especially when the latter involves frequency-doubling of the output of the amplifier 8 of Figure 1. No features of invention are ininvolved in the transmitter when adapted to these requirements, and transmitters with doubling applicable to the instant use are available.

*The exciter 5*

Figure 3:
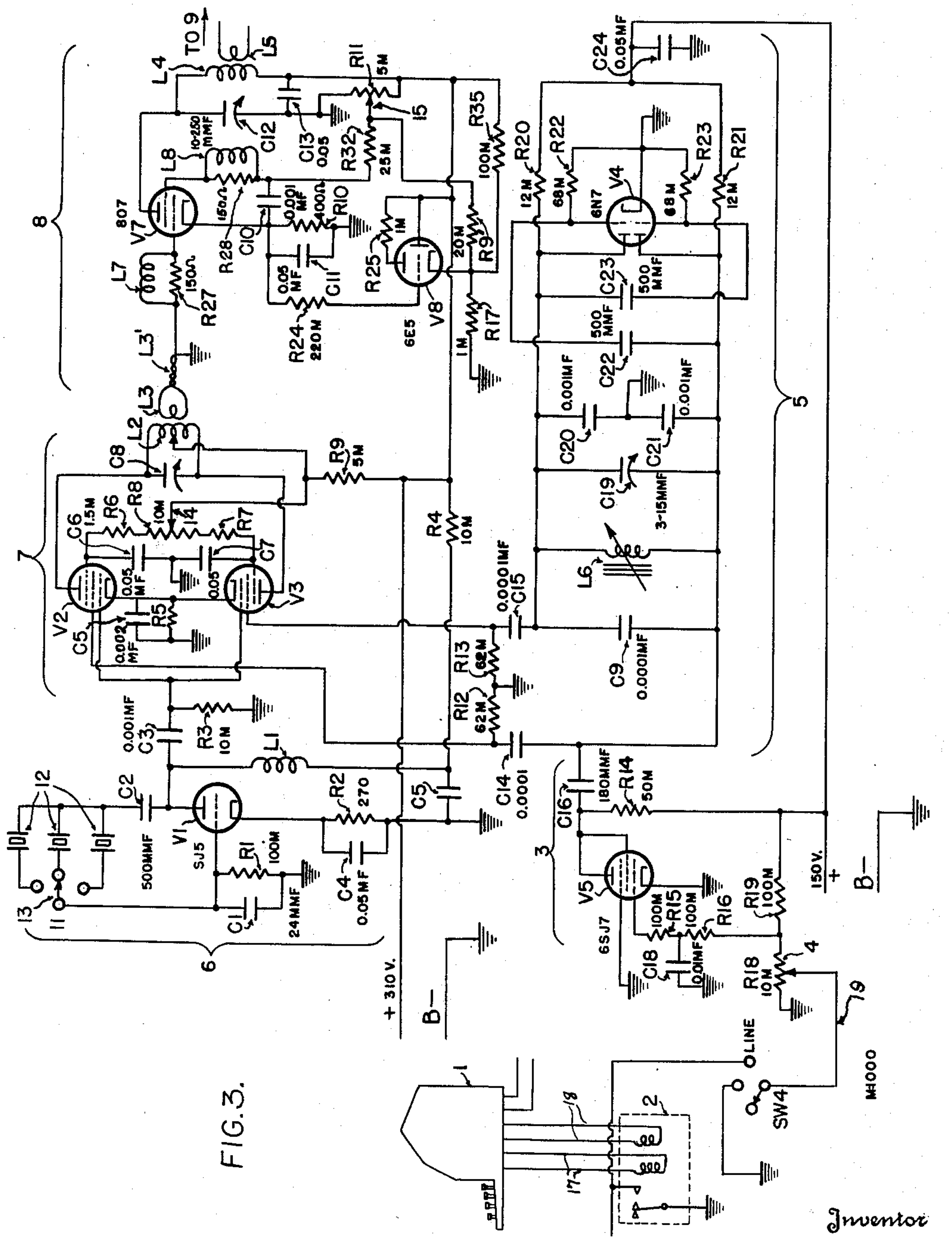
Figure 3 is a circuit diagram of an exciter circuit for a transmitter in which my invention is incorporated.

Referring to the circuit details of the invention shown in Figures 1 and 3, it may be explained that in practice the units shown in these figures designated by numerals 2, 3, 4, 5, 6, 7 and 8, are assembled in a single panel with an appropriate number of separate chassis each carrying the more closely coordinated circuit groups comprising the parameters required for basic functions of the invention. These chassis forms and groupings are not specifically defined in the disclosure since they are discretionary but the elements numbers 2 to 7 of Figure 1 are shown in Figure 3 as a unit, since this group is generally defined as an "exciter."

Giving attention to the details of the elements of the exciter which are more specifically shown in Figure 3, specific details of power supply, voltage regulation, and teletypewriter transmission to the relay or electrode or mechanical keyer 2 of Figure 1 are thought unnecessary to illustrate and are omitted.

*Crystal oscillator 6*

The crystal oscillator 6 is a Pierce type circuit, and comprises a crystal selector switch unit 11 in which three switch points are connected to one electrode of respective crystal units 12 of different frequencies chosen for predetermined alternative channel assignments. The arm 13 of the switch is connected directly to the grid of a triode V1 and the latter is returned across a resistor R1 to ground, bypassed by capacitor C1. The plate of this tube is coupled by capacitor C2 to the outer electrode of the selected crystal. The cathode of this tube is returned to ground through resistor R2, bypassed by capacitor C4. The plate supply is brought across an R.-F. choke L1 and resistor R4, and a R.-F. bypass capacitor C5 couples the B supply to ground between this inductance and resistor R4, these cooperating with L1 in avoiding disturbance of the plate current.

*The mixer 7*

In the mixer 7—a balanced modulator—pentode tubes V2 and V3 are used in push-pull relation at their screen grids to respond to the 200 kilocycle oscillator frequency, and at the normal control grids in parallel response to the crystal oscillator output. They are coupled to the plate of the crystal oscillator tube V1 by capacitor C3 feeding to the first injector or normal control grids of the tubes V2, V3 in parallel. This particular connection, in conjunction with other elements, has the effect of balancing out the crystal oscillations at the output of the mixer; but, in coaction with the input of the low frequency oscillator it develops the desired beat effect, as is well understood. The last named two grids have a common leak resistor R3 returned to ground. The cathodes of tubes V2 and V3 are returned to ground through biasing resistor R5 with R.-F. bypass condenser C5. The plates are connected directly to respective ends of the primary L2 of a transformer coupling the mixer output by secondary L3 to the amplifier. A center tap on this primary is connected to the plate voltage source by potentiometer arm 14 which wipes the middle one of three resistors R6, R8 and R7 connected in series between the suppressor grids of the two tubes, which serve as returns of the resonant take-off circuit. The arm 14 also provides an adjustment of relative voltages and plate circuit return, by which the effective balancing out of the crystal frequency may be perfected. The last named two grids are also coupled by respective bypass capacitors C6 and C7 to ground. In the potentiometer lead to the tap on the primary L2 last mentioned, the plate supply is connected thereto, across a resistor R9. Proper B voltages are thereby supplied to both the plates and suppressor grids of these two tubes. The primary L2 is bridged by variable tuning capacitor C8, the two constituting a parallel resonant circuit, which is tuned for the purpose of selecting one of the side bands produced by the beating together of the signals from the crystal oscillator 6 and the 200 kilocycle oscillator 5.

The output of the 200 kilocycle oscillator is fed to the middle or second injector grids (normally the screen grids) of the two tubes V2, V3 of the mixer, by coupling condensers C14 and C15, and those grids are returned to ground across respective resistors R12 and R13. The output from the mixer to the amplifier is taken from the secondary L3 of the coupling transformer, the two ends of which are incorporated in a twisted pair L3' to reduce inductive effects, one end being returned to ground, and the other serving as the lead to the amplifier.

*The amplifier 8*

The amplifier 8 may be of any form suitable for such purposes, of which a number of circuits are well known. The instant amplifier receives the output of the mixer through the choke L7 and parallel resistor R27 (as a filter of undesired (parasitic) frequencies) at the grid of an 807 tube V7. The cathode of this tube is returned through biasing resistor R10 with R.-F. bypass capacitor C11. Positive feedback is secured by a lead from the screen grid across a filter and series capacitor C10 to the cathode, the filter consisting of a choke L8 and resistor R28 in parallel. Resistor R32 and part of resistor R11 are connected in series between the last named filter and the plate supply by potentiometer arm 15, the second named resistor R11 extending beyond the arm 15 to ground, and the two resistors and filter serve as screen-dropping resistance. The plate supply arrives across the primary L4 of a coupling transformer, the secondary L5 of which serves as the coupling of the output to the transmitter 9. A variable capacitor C12 is connected between the plate and ground, as a tuning for resonance with the mixer output. The last named capacitor and the last named choke are coupled in series parallel by a capacitor C13 to complete the tank parallel-resonant circuit R.-F. path. The tube V7 is utilized additionally as a cathode follower in relation to a 6E5 resonance indicator tube V8, the cathode of the tube V7 being connected across resistor R24 to the grid of the resonance tube.

The resistor R11 is connected in series between the plate supply of tube V7 and ground, and is used as a potentiometer, its wiper 15 being in series with the resistor R32, filter L8–R28 and screen grid of V7. This wiper is also connected across resistor R9′ to the cathode of the resonance indicator tube V8, as part of the stabilizing means.

The cathode of the later tube is also connected to ground with a biasing resistor R17, in such relation that the eye of the beam is closed when the mixer and amplifier plate circuits are in resonant relation. This closure is dependent on proper adjustment of the side band tuning at the mixer and the output tuning at the amplifier. The resonance indicator cathode is connected between the resistors R17 and R9′ and beyond this junction, across an interposed resistor R35, with the plate supply of the units 6, 7 and 8.

*The 200 kilocycle oscillator 5*

The 200 kilocycle oscillator 5 comprises the 6N7 twin triode tube V4 in a push-pull self-excited oscillator circuit in which the tank comprises a variable choke coil L6 between the plates, having its inductance variable, preferably by using an adjustable slug (not shown), and a parallel variable capacitor C19 which is the normal frequency adjusting means, the slug being ordinarily undisturbed after initial setting. Positive feed-back from the plates is obtained across capacitors C22 and C23 to the opposite grids of the tube, and biasing grid leaks are provided at R22 and R23 to ground. The twin cathode lead of this tube is connected directly to ground without intervening impedance. The 150 volt plate voltage for this tube is fed in parallel across symmetrical resistors R20 and R21 from a supply, the voltage of which should be stabilized. Capacitor C24 serves to bypass R.-F. to ground and thus avoid disturbance of the plate supply. By adjustment of the parameters the output of this oscillator in the two leads to the mixer is symmetrical at the capacitors C14 and C15.

There thus become manifest in the mixer four major frequencies, as follows:

(1) The 200 kilocycle oscillator frequency;
(2) The crystal frequency;
(3) A sideband frequency 200 kilocycles higher than the crystal frequency;
(4) A sideband frequency 200 kilocycles lower than the crystal frequency.

The presence of the 200 kilocycle oscillator frequency will not be apparent because the mixer plate circuit is tuned in the range of, say, 2 to 6 megacycles. The crystal frequency will be of minor magnitude because it is fed into the mixer control grids in parallel and its direct transmission effectively balanced out or cancelled out in the symmetrical circuit of the mixer. However, the crystal frequency input will have been beat against in the tubes by the 200 kilocycle oscillator frequency and the expected sidebands evolved, either of which may be then accentuated by tuning means C8, R8 and amplified. The higher band is the one selected, both for the high output or "mark" frequency and for the low or "space" frequency and this band is tuned by the capacitor C8 after an initial adjustment of the resistance R8. Notwithstanding this tuning, it is possible to effect a variation of the mixer output plus or minus 1 kilocycle, by variations at the oscillator 5 and a shift much less than this is effected by the means to be described. The shift is manifest by reactance applied to one side of the 200 kilocycle oscillator circuit. But the modifying component is manifest in both sides of the oscillator circuit, so that a net change of the input to the mixer is attained having the desired frequency values at each limit.

*The reactance circuit 3*

The means for modifying the frequency of the 200 kilocycle oscillator is a reactance tube circuit of peculiar function specially designed and adapted to effect the desired end without complexity in the elements required, and eliminating movement in the system of essential members having appreciable mass or inertia, disregarding these factors in the electron.

The frequency-changing means for the 200 kilocycle oscillator herein (see Figure 3) comprises a 6SJ7 tube V5 in the present instance although the circuit is adaptable to use of other tubes, as will be understood from this disclosure. This tube is operated from the same 150 volt plate potential source as the 200 kilocycle oscillator, with an interposed resistor R14 to prevent communication of material parasitic signal feed back to the line. The cathode is grounded directly so that a minimum impedance of response to signal input at the control grid is interposed there. The screen grid and suppressor grid are used conventionally. The control grid in this device has a tank circuit of novel composition adapting this tube and its connected circuits to function with peculiar benefit in the frequency shift system, particularly in preventing the clicks, thumps and other manifestations marking interference with receivers tuned to other frequencies than those represented in the shift limits set up in the final output of this exciter.

The control grid is returned to ground through three resistors, R15, R16 and R18 in series, the first two being of 100,000 ohms each, while the third, for instance, is of 10,000 ohms. Between the first two of these resistors (which may be called an intermediate high point in the grid return resistance), a pulse-rounding condenser C18 is coupled to ground in parallel with resistors R16 and R18, and at a junction between resistors R16 and R18 a dropping resistor R19 of 100,000 ohms is connected in a bias control lead from the plate supply voltage. In this relation, the resistor R18 serves additionally as a bleeder of current from the IR drop across R19 at the junction of the bias control lead and grid return. So much of the bleeder 18 as is effective at any given time regulates the bias of the tube V5, as will appear, so that the tube conducts at a rate adjusted to produce a required frequency effect in the 200 kilocycle oscillator circuit, allowing the latter to oscillate at its full rated frequency, or such frequency fixedly modified as necessary to produce the necessary "mark" high frequency at the output of the exciter. The V5 plate is coupled without other impedance to one of the plate leads of the V4 tube by means of a 180 micro-microfarad capacitor C16. In this aspect, the reactance circuit 3 is virtually a part of the plate tank circuit of the 200 kilocycle oscillator 5 as it forms a part of the reactance thereof, both by reason of the capacitor C16 and the small internal capacitance and by the impedance of the tube V5 and its circuits. Any change in the conductance of the tube varies the reactance effective across capacitor C16. In the use of the device one such condition is a normal one and is fixedly stable. Only one other condition in this respect is alternately manifest as in Figure 3, and that, too, is fixedly stable. Should the tube V5 conductance be increased, impedance of the tube is reduced, and lower frequency is involved in the oscillator. On the other hand, if conductance is reduced, as, by application of a negative-going potential on the grid of tube V5, impedance is increased, a higher potential is maintained at the near electrode, and frequency of oscillation in the plate-tank circuit of oscillator 5 correspondingly raised.

Means is provided for effecting the necessary changes of potential on the grid of tube V5 in response to key operations or other circuit closing and opening at the Teletype machines, the essentials of which are shown in Figure 3. This is a relay 2, which corresponds to the block element 2 of Figure 1, as one conventional possibility.

This relay indicates the nature of the pulses by which the shifts of frequency of the 200 kilocycle oscillator are preferably effected. The relay is operated customarily from the teletypewriter automatic coding sending machine by alternate opposite current pulse polarities in code circuits 17—18, swinging the armature in respective directions. With the line closed at switch Sw4 below relay 2, on movement of the relay arm to the right, the resistance-shorting shunt circuit 19 is closed to ground from an intermediate point on bleeder resistor R18. This increases the bleeding of current from IR drop at R19 and lowers the potential effective at the grid of the reactance tube V5 in the circuit 3. This swings the grid less positive, reducing conductance in the tube, raising plate voltage and increasing effective reactance in the tank circuit (including C16) of the oscillator 5 so as to raise its frequency. Opposite movement of the relay arm (to the left) at 2 opens the shorting circuit 19, making the whole of R18 effective, so that bleeding is reduced and a higher voltage made effective at the control grid of V5. This increases conductance in the tube and lowers its plate voltage, with a resultant lower frequency in the oscillator 5, and consequently in the signal output of the transmitter, in the manner before indicated.

The shunt connection from the relay 2 is made at a wiper arm operating on the resistor R18 which thus becomes a potentiometer the arm shorting out the ground end portion of this resistor when the relay is closed, and being adjustable to determine the rise in frequency caused on closing of the relay 2. This changes reactance time at C16 and produces the lower or "space" frequency signal as before indicated. The arm at R18 remains in a permanent position after all parameters are adjusted, so that a definite rise in frequency is produced in the oscillator 5 on each closing of the relay, and a like permanence of low frequency is involved by the values of the resistors when the shunt circuit is opened at the relay. Some adjustment of the level of frequency might be obtained by making the series resistance R15, R16, R18 variable independently of the shunt through the arm, but it is found more practicable to leave these fixed and use the adjustments at R8 and C8 of the mixer, and at L6 and C19 of the 200 kilocycle oscillator.

In the use of this apparatus, if the assigned frequency should be four megacycles, for instance, this may be satisfied where a single doubling at the transmitter is employed by selecting a crystal at the switch 11 which gives the crystal oscillator circuit 6 a frequency of 1,800,212.5 cycles and the self-excited oscillator at 5 would normally oscillate at its 200 kilocycle frequency, this beating against the crystal frequency in the mixer so that the additive side band filtered out will have the "mark" value of 2,000,212.5 cycles as it reaches and leaves the amplifier. In case the crystal is not exactly of the value desired, this may be compensated for by an adjustment of the unit 4 or the side band tuning at C8, Figure 3, or both, or use of the tuning in the 200 kilocycle oscillator with or without adjustment of the resistor R8, in the mixer 7. This frequency after amplification is then doubled conventionally in the transmitter, producing a mark signal frequency of 4,000,425 cycles. The shift control at potentiometer 4 is then adjusted so that with the reactance in circuit 3, on closing operation at the relay, the frequency of the self-excited 200 kilocycle oscillator is shifted by the introduced impedance at the grid in circuit 3 downward to 199,575 cycle s by the introduced reactance at circuit 3. This added to the crystal frequency by the mixer produces the intermediate frequency of 1,999,787.5, which is amplified and doubled once in the transmitter to produce the space signal of 3,999,575 cycles "on the air." By this function of the system it will be observed that the "assigned" frequency is never "on the air," but the two alternate frequencies are transmitted in such manner that no intermission occurs exceeding the interval in either signal frequency, or sufficient to cause impairment of efficiency of transmission and reception, or to cause interference at receivers tuned to different channels or frequencies.

Should compensation be required for variation of the crystal from the desired frequency therefor, the self excited oscillator, may be correspondingly adjusted by the arm of the resistor R18 at 4 and the sideband filter or resonating adjustment at the mixer 7 so that the desired outputs to the amplifier from the mixer may be secured having the required frequencies. The adjustment thus available permits a tolerance of 1 kilocycle plus or minus in the value of the selected crystal. Of course, in the case of an arbitrary assigned frequency some variation from the exact upper and lower limit frequencies is thus possible within the permissible frequency error limits set by governmental regulations so that the upper frequency transmitted may be slightly more than 425 cycles above that assigned, or the lower transmitted frequency may vary correspondingly. However, in order to avoid difficulties in reception an exact adjustment to the ideals on the air with a difference of 850 cycles is desirable, and is the conventional practice.

It should be appreciated that the selection of the values of the capacitors C16 and C18 is a material factor in enabling the optimum of effectiveness and rapidity of shift from one frequency to the other at the same time that the tendency toward a square wave form in the shift with attendant prohibitive interference manifestations is modified. The condenser C18 also has a phasing function contributing to this result, as will appear. Thus, a large value at C18 could produce a shift with a pulse form having markedly sloped sides, corresponding to an exponential curve extending over a substantial part of the duration of the pulse unit. If the value at C18 is too small the rounding effect would become so small a modification of the angularity of the rise or fall of the pulse, that there might be an unappreciable rise time with such finitesmal rounding at the extreme corner that the objectionable manifestations of simple make and break forms would be approximated. With the value indicated in this capacitor, however, it has been found that a rounding at the extremes of the shifts is produced sufficient to reduce interference to innocuousness, while yet retaining a practically vertical rise in the major portion of the shift, with a flat top or bottom of relatively long duration, according to the direction of the shift.

It will be seen in the disclosure made, that, while the shift is initially dependent on a make and break of a circuit at the relay, the actual change in the self-excited oscillator circuit is not due to a simple abrupt change from an open circuit to closed circuit, or vice versa, but to an electronic change in conductance in an element of a collateral circuit, modified in a novel relation to certain interference factors so that the latter are suppressed, which they would not be if the make and break were directly in one of the circuits of the oscillator corresponding to the prior practices mentioned in the introduction to this specification.

In discussing the shift from one frequency to another in the operation of the system disclosed, the shift from the lower frequency to the upper one may be said to be a pulse having a rise time, and the shift from the upper frequency to the lower one may be said to have a fall time. In a major intermediate part of each of these rise and fall times, the time is inappreciable and the completion of the major part of the shift is practically instantaneous. At the start of each shift, however, owing to the explained function of the capacitor C18 and resultant effect on the impedance and/or resistance of the tube V5, there is a material time component from the instant of beginning of change of conductance of the tube to the approximate stabilizing of the reactance at C16 accompanying the change, and the rise time and fall time may be said to begin with key action at relay 2 and to continue to the completion of the shift by action of the tube and its tank. This time will be small and the curve representing the beginning of shift and these times would closely approximate one tangent to the top or bottom of the shift and tangent to a vertical rise or fall represented at the side of the pulse form, the curved part having a time value in the neighborhood of one-tenth more or less the rise or fall dimension of the pulse form. But in any event this curve is only manifest materially at the extreme beginning and end of the side of the pulse produced on each shift. The form of this curve can be mathematically computed using principles of the Fourier analysis.

As before indicated the resistor R18 or so much of it as is effective on closed key at relay 2, serves as a bleeder by which a potential of moderate voltage is derived at the drop across R19, and cooperating with resistances R15 and R16 in the biasing of tube V5.

In operation during teletypewriter transmission, the unit 3 functions substantially as follows:

At open-key condition at relay 2, all of R18 as well as R15—R16 is effective. Less "bleeding to ground" will occur at the R19 drop, and the higher voltage level will be manifest at the end of R19, which will be accompanied by a higher grid potential and maximum conductance in the tube. At initial opening of the relay at 2, when the grid swings more positive, the function of capacitor C18 becomes effective by charging and performing a phase modifying function at the grid, so that the rise of conductance is relatively gradual at the start, and involves rounding of the corner of the pulse form of the shift signal, since the capacitor is thus effective over only a small part of the pulse time or the code unit duration time. On closing of the relay 2, part of R18 is shorted to ground increasing the bleeding of current from the potential at the drop across R19, lowering voltage there, with corresponding effect at the grid of the tube V5 and consequent reduced conductance in this tube. But the reduction of grid potential and fully lowered conductance is delayed by discharge from capacitor C18, so that the beginning of the signal shift to high frequency starts gradually, increasing exponentially over a short part of the code unit time producing an effect similar to the form of the corners of the shifts represented in Figure 2. The reduced potential becomes quickly stabilized at the R19 drop and the top of the shift becomes substantially flat.

The system is adapted for use in facsimile or picture transmission by radio as well as radio telegraph and teletypewriter systems, although in their uses the relay 2 specifically disclosed would be replaced by apparatus appropriate to the use and not comprised in the invention hereinafter claimed.

While the invention has found its greatest value in enabling the practical use of frequency-shift transmission in radio teletypewriter systems, it may also find value in wire transmission teletypewriter operation if several frequency ranges or channels are used on the same wire circuit. A single channel wire system may operate without causing difficulty by interference with radio receivers when a simple make and break shift between different frequency transmitters is practiced as in the first days of the use of the commercial system known as the "Teletype." However, if several such sets of transmitters operating at different levels of frequency are used on a single wire line, and respective receivers are connected to the line tuned to respond to these respective sets of frequencies, the "clicks" and "thumps" representing harmonics produced by square wave effects, are liable to impair operation of all the systems or channels involved on a given wire. My invention then becomes important in enabling multichannel teletypewriter and like frequency shift communication on the single wire circuit.

The above description is to be considered as illustrative and not limitative of the invention, of which modifications obviously may be made. While specific frequencies have been set forth, clearly other frequencies and other oscillator control within the scope of the claim may be employed without departing from the spirit of the invention.

I claim:

1. In a frequency shift for oscillators of the character described wherein the oscillator includes a resonant circuit including capacitance, and having an output circuit across said capacitance effective to control the frequency of the oscillator, a reactance tube circuit comprising essentially a triode having a plate circuit, a capacitor coupling the plate circuit to the resonant circuit of the oscillator, a maximum external resistance in series with the grid and cathode of the reactance tube, an electrical positive biasing source connected intermediately of said resistance in series with the remainder of said resistance, grid and cathode, a condenser connected intermediately of said remainder of the resistance in series to ground, a shorting key circuit adjustably connected with the ground end portion of said resistance outward of said connection with the said biasing electrical source, and including a circuit opening and closing means.

2. A keying unit for frequency shift teletypewriter transmission systems in which the keying unit includes a circuit reactively coupled to a low frequency resonant oscillator circuit to vary the frequency of the latter, the output of the oscillator applied to a mixer with the output of a high frequency oscillator and a filtered sideband of the mixer output transmitted as radiated energy; said keying unit comprising a vacuum tube having an anode, a cathode and a control grid; an operating potential voltage source in series between the plate and cathode, a capacitor having one electrode connected directly to the plate and the other adapted to be connected in coupling relation to the said resonant oscillator circuit, a resistance in series between the plate and cathode, a grid return resistance between said grid and the negative of said operating potential source, a pulse rounding capacitor coupled between an intermediate high point of said grid return resistance and the negative of said operating potential source, a shorting connection between a low value intermediate point in said grid return resistance and a more negative point in the grid return, a small positive potential applied to the grid return resistance intermediately of the part thereof between said shorting connection and the connection with said pulse-rounding capacitor, and a make and break keying device in the said shorting connection.

3. In a radio communications system wherein pulse code signals of different frequencies and predetermined unit duration are transmitted in immediate succession by frequency shift of oscillations in a normally stable oscillator circuit of a transmitter exciter; a keying system to shift the frequency of said oscillator comprising an electron valve device having an anode, a cathode, and a control electrode, a principal amplitude voltage source in series externally between the cathode and anode, an external grid return including a resistance, a bias control voltage source connected to the grid return resistance at a junction intermediately of the latter in series with the terminal part of said resistance, said terminal part constituting a bleeder resistance, a resistor in the line between the last named source and said junction, a pulse-rounding capacitor connected to the grid return resistance intermediately of the part between said junction and the grid, said capacitor in parallel with the terminal part of the grid return beyond said connection with the capacitor and in series with said bias control voltage source and intervening portion of the grid return resistance, a resistance-shorting line connected intermediately to the bleeder resistance parallel to a predetermined part of the latter to short out the last named part at times, and a circuit closing and opening device in said resistance shorting line operable at will, said capacitor, bias control voltage source and resistance components effective therewith having a time constant value effective to produce a rounding of the start of each change of bias incident to operations of said circuit closing and opening device, and such that said rounding extends over only a small part of the said unit duration of said pulse code signals.

JOHN HARVEY McCOY.

References Cited in the file of this patent

UNITED STATES PATENTS

| Number | Name | Date |
|---|---|---|
| 2,074,440 | Usselman | Mar. 23, 1937 |
| 2,103,847 | Hansell | Dec. 28, 1937 |
| 2,212,548 | Noxon | Aug. 27, 1940 |
| 2,225,691 | Finch | Dec. 24, 1940 |
| 2,349,811 | Crosby | May 30, 1944 |
| 2,403,358 | Gerhard et al. | July 2, 1946 |
| 2,476,141 | Goddard | July 12, 1949 |
| 2,492,791 | Finch | Dec. 27, 1949 |
| 2,492,795 | Goldstine | Dec. 27, 1949 |
| 2,531,103 | Beckwith | Nov. 21, 1950 |